United States Patent [19]

Carter et al.

[11] 4,090,980

[45] May 23, 1978

[54] METHOD FOR PREPARING REDUCED METAL CATALYST HAVING METAL SURFACE AREA

[75] Inventors: James L. Carter; Allan E. Barnett, both of Westfield, N.J.

[73] Assignee: Exxon Research & Engineering Co., Linden, N.J.

[21] Appl. No.: 794,370

[22] Filed: May 6, 1977

Related U.S. Application Data

[63] Continuation-in-part of Ser. No. 633,809, Nov. 20, 1975, abandoned.

[51] Int. Cl.$^2$ .................... B01J 29/00; B01J 29/10
[52] U.S. Cl. ................... 252/454; 252/459; 252/477 Q
[58] Field of Search ............ 252/454, 459, 472, 477 Q

[56] References Cited

U.S. PATENT DOCUMENTS

| 1,001,279 | 8/1911 | Kayser | 252/477 Q |
|---|---|---|---|
| 2,565,347 | 8/1951 | Bremner et al. | 252/477 Q |
| 2,677,668 | 5/1954 | Ahlberg | 252/477 Q |
| 2,750,261 | 6/1956 | Ipatieff et al. | 252/452 X |
| 3,838,066 | 9/1974 | Lovell | 252/419 |
| 3,868,332 | 2/1975 | Carter et al. | 252/452 |

OTHER PUBLICATIONS

Yamanaka et al., J. Sci. Research Inst. (Tokyo), 51, 168–169, (1957).
Popowicz et al., Prsemysl Chem., (Poland), 44, (6), 305–308, (1965).

*Primary Examiner*—Carl F. Dees

*Attorney, Agent, or Firm*—Albert P. Halluin

[57] ABSTRACT

This invention pertains to a method of stabilizing, with respect to atmospheric air, a bed containing pyrophoric reduced metal catalyst with high active metal surface area formed by reduction of a compound of said metal at an elevated temperature ranging from 200° to 500° C. which comprises:

(a) continuously circulating through said bed a stream of inert gas while maintaining a catalyst temperature of at least 300° F. (149° C.);

(b) cooling the catalyst throughout the bed with said inert gas until the catalyst in said bed attains a temperature ranging from 50° F. (10° C.) to 100° F. (38° C.);

(c) decreasing the inert gas flow and progressively adding $CO_2$ until the $CO_2$ concentration in the gas stream is at least 80%;

(d) adding $O_2$ to the gas stream to obtain about 0.05 vol % $O_2$ in the gas stream and continuing this flow until a sufficient amount of $O_2$ has passed though the catalyst bed to attain about 25% of a monolayer coverage of oxygen on the active metal surface;

(e) increasing the $O_2$ concentration in the gas stream at a rate that will have passed enough $O_2$ through the catalyst bed to form about a monolayer on the active metal surface by the time the concentration reaches about 1 vol. % $O_2$; and (f) increasing the $O_2$ concentration and decreasing the $CO_2$ until said catalyst is stabilized with respect to atmospheric air, said stabilization treatments being characterized as providing a stabilized catalyst without loss of the initial metal surface area.

12 Claims, No Drawings

METHOD FOR PREPARING REDUCED METAL CATALYST HAVING METAL SURFACE AREA

CROSS REFERENCE TO RELATED APPLICATION

This application is a continuation-in-part of U.S. Ser. No. 633,809, filed Nov. 20, 1975, and now abandoned.

BACKGROUND OF THE INVENTION

A. Field of the Invention

This invention relates to the manufacture of a catalyst. In one embodiment, it relates to an improved method for stabilizing a finely divided reduced metal catalyst with respect to atmospheric air. In another embodiment, it relates to a method for stabilizing pyrophoric reduced metal catalysts against atmospheric oxidation without loss of metal surface area.

Finely divided, reduced metal catalysts prepared in accordance with prior art procedures are subject to the disadvantage that they are pyrophoric, i.e. when exposed to atmospheric air they tend to oxidize very rapidly. Such a rapid oxidation produces considerable heat and may heat the catalyst to excessively high temperatures. It is understandable both because it makes the catalyst hazardous to handle and because it reduces or destroys the catalytic properties of the catalyst that such action is to be avoided. Hence, it is the usual practice to stabilize the catalyst with respect to atmospheric air following the reduction step.

B. Description of the Prior Art

In accordance with one previously proposed process, described in U.S. Pat. No. 2,677,669 which issued on May 1, 1954, upon completion of the reduction step, nitrogen was introduced into the circulating system and hydrogen vented continuously to cause the nitrogen to replace the hydrogen in the circulating system. At the same time, the bed was cooled to a temperature of around 50° F. and carbon dioxide was introduced into the circulating gas to replace the nitrogen and the nitrogen subsequently vented. When the nitrogen had been replaced by carbon dioxide, elementary oxygen was added to the circulating system in an amount sufficient to produce an oxygen concentration of about 0.1% by volume and circulation of the oxygen-containing gas through the catalyst bed was continued. The bed was provided with a large number of thermocouples to permit observation of temperatures throughout the bed so that "hot spots" could be rapidly and effectively detected. Circulation of the carbon dioxide containing 0.1% oxygen was continued until temperature conditions within the bed were stabilized at 50° F. The oxygen concentration of the circulating gas was then increased in steps by further additions of elementary oxygen and the gas circulating under each oxygen condition until stable temperature conditions were again obtained within the bed. When the bed became stabilized to oxygen concentrations of about 3% at 50° F., it was warmed to 95° F. and atmospheric air was continuously vented to cause the air to replace the carbon dioxide atmosphere. The air was added at a relatively slow rate, i.e. such a rate requires at least six hours for complete replacement of the $CO_2$ by the air. At the end of this period, it was found that the catalyst was completely stable to atmospheric air and could be packaged or stored as desired without danger of spontaneous overheating.

In another patent, U.S. Pat. No. 2,677,668, there is described a method of stabilizing with respect to atmospheric oxidation, finely divided pyrophoric metal catalysts comprising the steps of exposing said catalyst, after reduction, to an atmosphere of carbon dioxide about room temperature, introducing into said atmosphere, approximately 0.1% by volume of oxygen, feeding oxygen to said atmosphere over a period of time till said catalyst is stable to atmospheric air, and interrupting the addition of oxygen to said atmosphere periodically to prevent the temperature of said catalyst from rising above about 125° F.

Other prior art describing methods for stabilizing finely divided pyrophoric reduced metal catalyst with high metal surface area but less relevant to the method described in the subject application are:

U.S. Pat. No. 2,495,497 describes a process for stabilizing a reduced metal catalyst by wetting, followed by exposure to air until any amount of the liquid has evaporated. Steam or water are disclosed as effective stabilizers. If these stabilizers are used, drying in nitrogen or other inert gas at moderate temperatures restores full catalyst activity;

U.S. Pat. No. 2,565,347 discloses the stabilization of pyrophoric metal catalysts under fluidized conditions. The catalyst is prepared by reducing a finely divided heavy metal oxide, hydroxide or carbonate with a mixture of hydrogen and inert gas, cooling the reduced metal to below 60° C. by a stream of inert gas, and then superficially oxidizing it at below 60° C. with a mixture of oxygen or air and inert gas;

U.S. Pat. No. 3,033,802 which describes a method for stabilizing reduced metal catalysts in which the catalyst is entrained in a carrier stream of non-oxidizing gas and controlled amounts of oxygen-containing gas are added to oxidize the absorbed hydrogen to water vapor;

U.S. Pat. No. 3,838,066 which describes a method for stabilizing pyrophoric materials in a catalyst bed comprising the steps of purging the bed with an inert gas at 100°–500° F. and 15–5000 psig and adding a controlled amount of oxygen-containing gas to the inert gas to oxidize the pyrophoric materials.

East German Pat. No. 14,989 which describes a process whereby hydrogenation catalysts on an alumina carrier are heated at 400°–600° C. for about 24 hours in an oxidizing atmosphere containing $O_2$, $H_2$, $CO_2$ and $H_2O$;

Japanese Pat. No. 4,325 (1958) which shows that the stability of reduced nickel is increased by heating in an inert atmosphere, e.g., $CO_2$ or $N_2$;

Japanese Pat. No. 6,365 (1960) which discloses a process wherein Raney nickel or copper directly obtained by a NaOH solution is washed with water and then with an alcohol while passing $CO_2$ through the catalyst to remove oxygen completely. The catalyst is then treated in $CO_2$ at 3–5 mm and at 70° C. It is alleged that this catalyst has improved stability in air;

Yamanaka and Takagi, *J. Sci. Research Inst.* (Tokyo), 51, 168-9 (1957) disclose a process for the stabilization of nickel catalyst with $CO_2$ as the inert gas at elevated temperatures followed by cooling to ordinary temperatures in the $CO_2$ atmosphere and retained in the $CO_2$ atmosphere. It is disclosed that these stabilized hydrogenation catalysts have improved efficiency and retain their activity for 1 year if kept under airtight seal and for 5 hours if left exposed.

Popowicz et al., *Prsemysl Chem.*, 44 (6), 305-8 (1965) (Poland) also disclose a process for the stabilization of nickel catalysts on an $Al_2O_3$ carrier by treating the reduced catalyst at 30° with $N_2$ containing a small amount of $O_2$ (about 0.15% by volume) to remove the adsorbed hydrogen. It is disclosed that both the amount of hydrogen present in the catalyst and the activity of the latter after reactivation depend on the temperature and the reactivation time.

Schmitt, *J. Fire Flammability*, 2 (April), 157–72 (1971) has provided a literature review on pyrophoric materials which includes fundamental information on various types of pyrophoric materials so as to indicate the various factors that affect pyrophoricity.

DISCOVERY OF THE PRESENT INVENTION

Prior art workers have considered $CO_2$ to be an inert gas in stabilization processes and have used it in place of nitrogen. However, it has been observed by the present inventors that $CO_2$ in fact adsorbs on the catalyst, as evidenced by a mild heat release as the $CO_2$ is added, and serves to moderate the reaction of $O_2$ with the metal. From this observation it was discovered that if the $CO_2$ gas flow over a cooled catalyst bed is maintained at a constant rate and sufficient air (or $O_2$) is added to provide about 0.05 mol % $O_2$ in the gas and these conditions are maintained until enough $O_2$ has been added to give about 25% of a monolayer of $O_2$ on the active metal, the $O_2$ concentration can be gradually increased to atmospheric conditions to produce a catalyst which is stable with respect to atmospheric air without loss of the initial metal surface area.

SUMMARY OF THE INVENTION

The present invention briefly comprises the sequential steps of: purging a bed containing a pyrophoric reduced metal catalyst at elevated temperatures of at least about 300° F. (149° C.) with an inert gas stream, i.e., a gas stream comprised of nitrogen, argon, helium or mixtures thereof, preferably nitrogen; cooling the catalyst in the bed with the gas stream to a temperature ranging from about 50° F. (10° C.) to about 100° F. (38° C.) with the gas stream; adding $CO_2$ to the gas stream; decreasing the inert gas stream flow at a rate to maintain a constant gas flow whereby the inert gas is replaced with $CO_2$; progressively adding $O_2$ to achieve a concentration in the gas stream of 10% to 20% $O_2$, 20% to 40% $CO_2$ and 40% to 70% inert gas; uniformly removing the $CO_2$ over a period of 10 to 15 minutes.

An important feature of the present invention is the addition of air to the $CO_2$ gas stream at a constant total gas flow rate to provide about 0.05 mol % $O_2$ in the gas stream. These conditions are maintained until enough $O_2$ has been added to give about 25% of a monolayer of $O_2$ on the active metal. The oxygen concentration is then increased in steps to about 0.2%, 0.5% and 1.0% so as to have added enough $O_2$ to form about a monolayer on the active metal when 1% $O_2$ has been established. The purpose of such a process is to oxidize selectively the more active portions of the catalyst under conditions that are so controlled as to prevent excessive heating of the catalyst and consequent damage to the catalyst. However, it has been found that even when the admission of oxygen is carefully controlled, there is still a tendency toward localized overheating or "hot spotting" in the catalyst bed. Once such "hot spots" occur, it is necessary that the addition of oxygen be interrupted until the "hot spot" has been cooled to the desired low temperature and thus frequent "hot spotting" not only damages portions of the catalyst but also substantially increases the time required for the stabilization process.

DESCRIPTION OF THE PREFERRED EMBODIMENT

The present invention specifically pertains to a method of stabilizing, with respect to atmospheric air, a bed containing pyrophoric reduced metal catalyst with high active metal surface area formed by reduction of a compound of said metal at an elevated temperature ranging from 200° to 500° C. which comprises;

(a) continuously circulating through said bed a stream of an inert gas while maintaining a catalyst temperature of at least 300° F. (149° C.);

(b) cooling the catalyst throughout the bed with said inert gas until said catalyst in the bed is less than 120° F. (50° C.), preferably less than 85° F. (30° C.) and more preferably a temperature ranging from 50° F. (10° C.) to 100° F. (38° C.)(this temperature can be ascertained by use of thermocouples on the bed);

(c) decreasing the inert gas flow and progressively adding $CO_2$ until the $CO_2$ concentration in the gas stream is at least about 80%, preferably at least about 95%, and more preferably at about 100%;

(d) adding $O_2$ to the gas stream to obtain about 0.05 vol. % $O_2$ in the gas stream and continuing this flow until a sufficient amount of $O_2$ has passed through the catalyst bed to attain about 25% of a monolayer coverage of oxygen on the active metal surface;

(e) increasing the $O_2$ concentration in the gas stream at a rate that will have passed enough $O_2$ through the catalyst bed to form about a monolayer on the active metal surface by the time the concentration reaches about 1 vol. % $O_2$; and (f) increasing the $O_2$ concentration and decreasing the $CO_2$ until said catalyst is stabilized with respect to atmospheric air, said stabilization treatments being characterized as providing a stabilized catalyst without loss of the initial metal surface area.

The instantly claimed process provides a method of controlled stabilization of the catalyst whereby there is substantially no loss of metal area as a result of the stabilization process. Once the catalyst has been stabilized, it can be packed, shipped or otherwise handled under atmospheric conditions. When it is to be put to use, one simply places it in a suitable reactor and activates the catalyst by methods known in the art. The reactivated catalyst has substantially all (generally 100%) of the initial active metal surface area. As shown in Examples 1 and 2, if the oxygen is not added in the manner provided by the stabilization process of the present invention, losses in potentially active metal surface area will occur. Thus, the coaction of the sequential steps of the process of the present invention provide an improved means for stabilizing pyrophoric reduced metal catalysts.

The term "monolayer" as used herein is defined as a coverage of all the metal atoms in the catalyst surface. Thus, a 25% of a monolayer coverage of the active metal surface means that there is a 25% coverage of all the metal atoms in the catalyst surface. The active metal surface area of the catalyst can be determined by means of a hydrogen chemisorption isotherm.

The catalyst material which may be stabilized by the process of the invention may include any pyrophoric material, e.g., finely divided nickel, cobalt, iron or other metallic materials. Nickel catalyst are the preferred pyrophoric materials to be used in the process of the present invention. Preferably, the pyrophoric material is on a support, e.g. a silica material.

In a particularly preferred aspect of the invention, the catalyst to be stabilized by the process of the present invention may be prepared as follows:

The catalyst is prepared by precipitating nickel and silicate ions from solution as nickel oxide, nickel carbonate and nickel hydroxide onto porous silica particles such as Kieselguhr, for example, in such proportions, that the activated catalyst contains 25 to 50 wt. % nickel and under conditions of dilution, such that high concentrations of dissolved nickel are never present in solution with dissolved silicate. Of its total silica content, 30 to 90 wt. % thereof is derived from the precipitated silicate ions. The catalyst is activated by calcining in air the particles of porous silica and their associated deposit of nickel oxide, nickel carbonate and nickel hydroxide at a temperature in the range of from about 300° to 450° C. and then reducing with hydrogen the resulting calcined solid at 200° to 500° C. for several hours. Following this activation procedure, the catalyst may be subjected to the stabilization process of the present invention. (For a more detailed description of the preparation of the nickel catalyst described above, reference is made to U.S. Pat. Nos. 3,697,445 and 3,868,332, the disclosure of which are incorporated herein by reference. These patents disclose massive nickel silica catalysts having a nickel surface area greater than 70 m$^2$/g of catalyst).

In another modification of this same system, a copper promotion is instituted and in these copper promoted massive nickel catalysts they are prepared as follows: Two solutions, one containing copper and nickel cations and the other containing the silicate anion, with porous silica particles slurried therein, are comingled at a slow rate to effect maximum mixing. Typically, the nickel and copper nitrate solution would be added to a sodium meta silicate solution, containing porous silica particles; uniformly over approximately a 5 to 40 minute period. The mixture is then heated to the boiling point and coprecipitation of copper, nickel and silicate ions must be completed. This may be effected by various methods known in the art, but it is most preferred that the coprecipitation of copper nickel and silicate ions in aqueous solution containing the solid carrier particles be completed by addition of a water soluble alkaline precipitating compound such as ammonium bicarbonate. The alkaline ammonium precipitants are most suitable for minimizing the amount of alkali metal residue which has to be removed by washing to avoid poisoning action on the finished catalyst. Following the precipitation, the mixture is maintained at the boiling point for about 1 to 5 hours; then it is filtered and washed four times with boiling water. The precipitated catalyst is then dried by heating for about 1 to 5 hours at a temperature of 90° to 200° C. It is then calcined by heating in the presence of an oxygen-containing gas or air to a temperature in the range of 300° to 450° C for a period of 2 to 8 hours, preferably 3 to 5 hours, after which the catalyst is reduced in an atmosphere of hydrogen in order to activate it. A more detailed description of this copper promoted massive nickel catalyst and its preparation is provided in U.S. application Ser. No. 577,328, now abandoned, the disclosure of which is incorporated herein by reference.

Upon completion of the reduction step in the aforesaid catalysts preparation, the hot reduction unit containing the resulting high surface area massive nickel system is flushed with an inert gas such as nitrogen and cooled to approximately room temperature. While purging the reaction vessel with nitrogen, at a superficial velocity of at least 0.5 ft. per second, $CO_2$ is added to the gas stream. The addition is made slowly while simultaneously decreasing the nitrogen flow to maintain a constant total gas flow so as to raise the $CO_2$ concentration from 0 to 80%, preferably 95% and more preferably 100% over about a 30 minute period. It has been observed that the $CO_2$ adsorbs onto the catalyst as evidenced by a mild heat release as it is added and serves to moderate the reaction of $O_2$ with the metal.

While maintaining the gas flow at a constant rate, enough $O_2$ from a suitable source such as air or the like is added to give approximately 0.05 vol. % oxygen in the gas. These conditions are maintained until enough $O_2$ has been added to give about 25% of a monolayer on the active metal. The $O_2$ concentration is then increased in incremental steps of from about 0.5% to 5.0%, preferably 0.8% to 2% by volume in order to have enough added $O_2$ to form about a monolayer on the active metal surface. The monolayer should be established before the $O_2$ concentration reaches 1% by volume. The $O_2$ concentration is then increased in steps to about 12% by volume. During all the various changes of $O_2$ concentration, the temperature of the catalyst bed is monitored closely and if the temperature rise exceeds about 20° F., the $O_2$ concentration is lowered and the concentration is increased again only when the temperature has subsided. If air is used as the $O_2$ source, when the $O_2$ concentration ranges from 8% to 17%, the nitrogen ranges from 30% to 68% and the $CO_2$ ranges from 62% to 15% by volume, preferably 10% to 15% $O_2$, 40% to 60% $N_2$ and 50% to 25% $CO_2$ % by volume. At this point the $CO_2$ concentration is reduced slowly and uniformly over about a 30 minute period while maintaining total gas flow constant. If the $CO_2$ flow is terminated at about the 40% level the $CO_2$ that is adsorbed on the active metal can desorb suddenly leaving reduced metal to react rapidly with the high $O_2$ concentration thus causing a rapid rise in the temperature to a high level which causes sintering of the metal with a permanent loss in the metal surface area, therefore, it must be removed over a period ranging from 5 to 30, preferably from 10 to 20 minutes.

The following examples serve to more fully describe the manner of making and using the above-described invention, as well as to set forth the best modes contemplated for carrying out various aspects of the invention. It is to be understood that these examples in no way serve to limit the true scope of this invention, but rather, are presented for illustrative purposes only. It will be understood that all proportions are in parts by weight, unless otherwise indicated.

EXAMPLE 1

In this example, a careful addition of oxygen into a nitrogen stream, in a widely used method, results in the loss of active metal surface area even though the measured temperature rise in the bed did not exceed 22° F. (−6° C.).

A catalyst charge of 700 cc of a massive nickel catalyst, with 45% nickel, was reduced in a two inch diameter reaction vessel. The hydrogen rate was 5.8 liters per minute and the reduction was carried out for 2 hours at 750° F. (399° C.) The hydrogen was purged from the system at 750° F. (399° C.) with nitrogen and the reaction vessel cooled to 72° F. (22° C.).

The nitrogen flow was adjusted to 17.4 liters per minute and the carefully controlled addition of oxygen was started. During the experiment the total gas flow was held constant at 17.4 liters per minute and the oxygen addition followed the schedule below. The oxygen was added by addition of air.

| Time | % $O_2$ in Gas |
|---|---|
| 0 – 920 minutes | 0.1 mol % |
| 920 – 940 minutes | 0.2 |
| 940 – 962 minutes | 0.4 |
| 962 – 967 minutes | 1.6 |
| 967 – 975 minutes | 6.4 |
| 975 – 985 minutes | 12.8 |
| 985 – 995 minutes | 21 |

After the stabilizing treatment, the active nickel surface areas was measured and found to be 88% of the starting value. Thus even though a very carefully controlled addition of $O_2$ was carried out and the temperature rise in the bed never exceeded 22° F. ($-6°$ C.) there was still a loss of 12% of the initial active nickel surface area.

EXAMPLE 2

In this example, another portion of the catalyst used in Example 1 was reduced and treated according to the following schedule. The catalyst charge was 700 cc and it was reduced for 2 hours at 750° F. (399° C.) with a flow of 5.8 liters of $H_2$ per minute. The hydrogen was purged from the system with $N_2$ at 750° F. (399° C.) and the vessel was cooled to 72° F. (22° C.). The $N_2$ flow was set at 17.4 liters per minute and the addition of $CO_2$ and oxygen was started. The oxygen was added to the system by adding air into the gas stream. The total gas flow was maintained at 17.4 liters per minute as the changes were made.

| Time | Mol. % $O_2$ | Mol. % $N_2$ | Mol. % $CO_2$ |
|---|---|---|---|
| 0–75 minutes | gradually | replacing | $N_2$ by $CO_2$ |
| 75–105 | 0.0 | 0.0 | 100 |
| 105–225 | 0.1 | 0.4 | 99.5 |
| 225–360 | 0.2 | 0.8 | 99.0 |
| 360–370 | 0.4 | 1.6 | 98.0 |
| 370–395 | 1.6 | 6.4 | 92.0 |
| 395–405 | 6.0 | 24.0 | 70.0 |
| 405–408 | 12.0 | 48.0 | 40.0 |

At 408 minutes the flow of $CO_2$ was terminated and within seven minutes the inlet part of the catalyst bed began rising in temperature and went rapidly to 370° F. (188° C.) which point the air flow was terminated. This rapid temperature rise was high enough to severely damage the catalyst by agglomeration of the metal and also by bulk oxidation of the metal.

This example illustrates the need for removing the $CO_2$ from the gas stream slowly near the end of the treatment.

EXAMPLE 3

In this example another portion of the catalyst used in Example 2 was reduced and treated according to the following schedule. The catalyst charge was 700 cc and it was reduced for 2 hours at 700° F. (371° C.) with a flow of 5.8 liters per minute of hydrogen. The hydrogen was then purged from the system with $N_2$ at 700° F. (371° C.) and the vessel was cooled to 78° F. (26° C.). The $N_2$ flow was set at 17.4 liters per minute and the addition of $CO_2$ and oxygen was started. The oxygen was added to the system by adding air into the gas stream and the total gas flow was kept constant at 17.4 liters per minute throughout.

| Time | Mol % $O_2$ | Mol % $N_2$ | Mol % $CO_2$ |
|---|---|---|---|
| 0–9 minutes | 0 | 88.5 | 11.5 |
| 9–16 | 0 | 70.1 | 29.9 |
| 16–26 | 0 | 61.5 | 38.5 |
| 26–44 | 0 | 47.7 | 52.3 |
| 44–49 | 0 | 0 | 100.0 |
| 49–230 | 0.05 | 0.2 | 99.75 |
| 230–260 | 0.1 | 0.4 | 99.5 |
| 260–290 | 0.5 | 2.0 | 97.5 |
| 290–300 | 1.0 | 4.0 | 95.0 |
| 300–310 | 6.0 | 24.0 | 70.0 |
| 310–320 | 14.0 | 56.0 | 30.0 |
| 320–325 | 16.0 | 64.0 | 20.0 |
| 325–330 | 18.0 | 72.0 | 10.0 |
| 330–340 | 19 | 76.0 | 5.0 |
| 340–350 | 20 | 80 | 0 |

After this stabilization treatment the active nickel surface area was measured and found to be equal to the starting catalyst. Thus by the method of Example 3, it is possible to pre-reduce and stabilize a high metal surface area catalyst without loss of this high metal surface area.

It will be understood by those skilled in the art that various modifications of the present invention as described in the foregoing examples may be employed without departing from the scope of the invention. Many variations and modifications thereof will be apparent to those skilled in the art and can be made without departing from the spirit and scope of the invention herein described.

What is claimed is:

1. A process of stabilizing, with respect to atmospheric air, a bed containing pyrophoric reduced metal catalyst with high active metal surface area formed by reduction of a compound of said metal at an elevated temperature ranging from 200° C. to 500° C. which comprises;
   (a) continuously circulating through said bed a stream of an inert gas while maintaining a catalyst temperature of at least 300° F. (149° C.);
   (b) cooling the catalyst throughout the bed with said inert gas until the catalyst in said bed attains a temperature ranging from about 50° to about 100° F.;
   (c) decreasing the inert gas flow and progressively adding $CO_2$ until the $CO_2$ concentration in the gas stream is at least about 80%;
   (d) adding $O_2$ to the gas stream to obtain about 0.05 vol. % $O_2$ in the gas stream and continuing this flow until a sufficient amount of $O_2$ has passed through the catalyst bed to attain about 25% of a monolayer coverage of oxygen on the active metal surface;
   (e) increasing the $O_2$ concentration in the gas stream at a rate that will have passed enough $O_2$ through the catalyst bed to form about a monolayer on the active metal surface by the time the concentration reaches about 1 vol. % $O_2$; and
   (f) increasing the $O_2$ concentration and decreasing the $CO_2$ concentration until said catalyst in the bed is stabilized with respect to atmospheric air, said stabilization treatments being characterized as providing a stabilized catalyst without loss of the initial metal surface area.

2. The process of claim 1 wherein the inert gas is nitrogen.

3. The process of claim 1 wherein the total gas flow is maintained constant as the various changes in flows are made.

4. The process of claim 1 wherein the $O_2$ gas is air.

5. The process of claim 1 wherein the $CO_2$ concentration in the bed in step (c) is at least about 95%.

6. The process of claim 1 wherein the catalyst is a nickel silica catalyst.

7. The process of claim 6 wherein the nickel silica catalyst has been promoted with copper.

8. The process of claim 1 wherein step (c) is carried out uniformly over about a 1 hour period.

9. The process of claim 1 wherein step (f) is carried out over about a 1 to 2 hour period.

10. A process of stabilizing, with respect to atmospheric air, a nickel silica catalyst with high active metal surface area formed by reduction of a compound of said metal at a temperature ranging from 200° to 500° C. which comprises:
   (a) continuously circulating through said bed an inert gas comprising nitrogen while maintaining a catalyst temperature of at least 300° F. (149° C.);
   (b) cooling the catalyst throughout the bed with said inert gas until said catalyst in the bed attains a temperature ranging from about 50° to about 100° F.;
   (c) decreasing the inert gas flow and progressively adding $CO_2$ until the $CO_2$ concentration in the gas stream is about 100%;
   (d) adding air to the gas stream to obtain about 0.05 vol. % $O_2$ in the gas stream and continuing this flow until enough $O_2$ has passed through the catalyst bed to effect about 25% of a monolayer coverage of the active metal surface;
   (e) increasing the $O_2$ concentration in the gas stream at a rate that will have passed enough $O_2$ through the catalyst bed to form about a monolayer on the active metal surface by the time the concentration reaches about 1 vol. % $O_2$; and
   (f) increasing the air flow and decreasing the $CO_2$ until the $O_2$ concentration reaches 20 vol. % and the catalyst is stabilized with respect to atmospheric air, said stabilization treatments being characterized as providing a stabilized catalyst without loss of the initial nickel surface area.

11. The process of claim 10 wherein the nickel silica catalyst has been promoted with copper.

12. The process of claim 10 wherein step (e) is carried out by increasing the $O_2$ concentration in increments to provide enough added $O_2$ to form about a monolayer on the active metal when about 1% oxygen has been established.

* * * * *